Oct. 6, 1931. A. C. WILSON 1,826,112
CONSTANT UNIFORM DELIVERY SIPHON
Filed Feb. 2, 1929
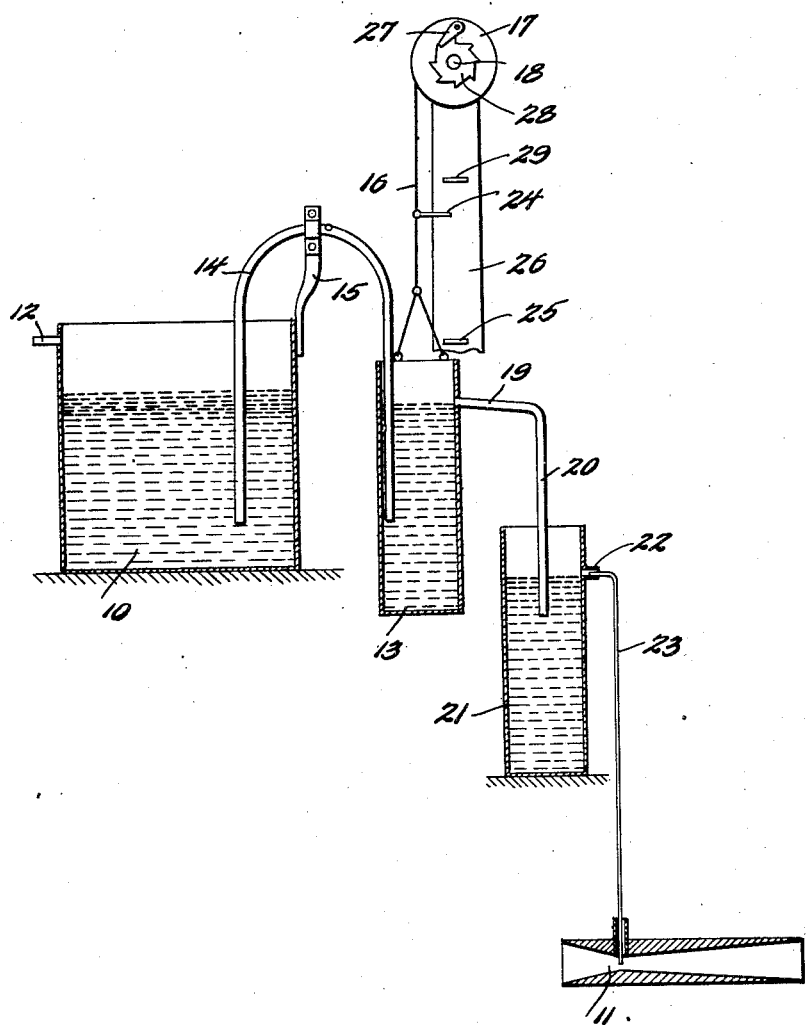
Inventor
A. Chesley Wilson
By Watson, Cot, Morse & Grindle
Attorney Patented Oct. 6, 1931

1,826,112

UNITED STATES PATENT OFFICE

ALVIN CHESLEY WILSON, OF BALTIMORE, MARYLAND, ASSIGNOR TO THE SILICA GEL CORPORATION, OF BALTIMORE, MARYLAND, A CORPORATION OF MARYLAND

CONSTANT UNIFORM DELIVERY SIPHON

Application filed February 2, 1929. Serial No. 336,987.

This invention relates to the method of and apparatus for liquid delivery and more particularly to such method and apparatus for delivering a constant uniform flow of liquid, particularly where the quantity handled is small.

It is a general object of the present invention to provide a novel method and apparatus for the constant uniform delivery of liquids.

One of the features of the present invention comprises the method of delivering liquid in small quantities continuously and uniformly by maintaining a constant difference in head between two connected vessels.

Another feature of the invention comprises the method of and apparatus for maintaining a constant uniform delivery of liquid by uniformly lowering a vessel which receives its liquid from a stationary vessel so that the rate of flow will be proportional to the product of the cross-section of the stationary vessel and the distance per unit of time that a point on the movable vessel moves.

Another feature of the invention comprises the method of and apparatus for maintaining the flow through a siphon constant by maintaining a constant difference in level between the liquids on the two sides thereof.

Other and further features and objects of the invention will become more apparent to those skilled in the art upon a consideration of the accompanying drawing and following specification, wherein is disclosed a single exemplary embodiment of the invention with the understanding, however, that such changes may be made therein as fall within the scope of the appended claims without departing from the spirit of the invention.

In said drawing:

The single figure is a schematic and diagrammatic illustration of apparatus for carrying out the method of the present invention.

In a number of chemical operations and in plants where it is necessary to mix liquids in various proportions by constant or continuous operation rather than by operation in batches, it is often desirable to provide means for delivering a small quantity of liquid uniformly and constantly into another which is flowing so that the ratio of the two liquids after mixture remains constant throughout the period of flow. A specific example of this is in certain operations in the refining of oil where sulphuric acid must be added at the rate of substantially 0.3% by weight of the oil approaching a certain treating operation. This acid must be added continuously and evenly in an unbroken stream, and since the volume to be added per minute in some cases is approximately 2 cc. for each gallon of oil per minute, it is readily understandable that considerable difficulties have been encountered in delivering so small a volume accurately, evenly, and with a minimum demand upon the operator's time. With the method and apparatus of the present invention, it has been found that satisfactory additions of acid in amounts as small as 1 cc. per minute have been secured.

Referring to the drawing, there is disclosed at 10 a reservoir of liquid which it is desired to add in small quantities to the fluid flowing through the mixing venturi 11. Obviously the fluid to which the liquid from the tank 10 is to be added can be flowing in any suitable conduit. The reservoir 10 is preferably of uniform horizontal cross-section throughout its height. It may be provided with an overflow pipe 12 to determine the height to which it is filled. Liquid is adapted to be delivered from the reservoir 10 into the movable receiving vessel 13 by means of a suitable conduit, here shown as a siphon tube 14 conveniently supported by means of a bracket 15 from the upper edge of the reservoir. This siphon consists of a simple bent tube, the free ends of which are always immersed in the liquid contained in the reservoir 10 and in the movable vessel 13. If the air is exhausted from the tube, there will be an interchange of liquid between the two vessels, the flow being from the higher to the lower level and due to the pressure differential existing between atmospheric pressure at the entrance and the vacuum at the bend of the siphon. This flow will continue until the liquid level in the two containers is the same, provided no air is permitted to enter the tube, and will cease when these levels become equal. Flow may be resumed by lowering the liquid level in one of the compartments. In the present invention, liquid is placed in both the reservoir 10 and the vessel 13, and siphon flow is established so that liquid flows from 10 to 13.

In order that the levels in 10 and 13 may not become the same (and so stop the flow), one container is arranged to be moved vertically at such a rate as to maintain a constant fixed difference in head between the liquid levels in reservoir 10 and vessel 13. Where the cross-section of reservoir 10 is constant, this can be effected by imparting a constant velocity to the moving vessel. By way of example, this can be accomplished by suspending the vessel 13 by a cable 16 which is wrapped about a drum 17 mounted on the shaft 18 which is constantly and uniformly driven by any suitable means, such, for instance, as an electric clock. The vessel 13 is thus arranged to be lowered steadily and uniformly as the cable unwinds from the drum 17, and the liquid will continue to flow uniformly from the reservoir 10 to the vessel 13. It has already been pointed out that the cross-section of the reservoir 10 is preferably constant, and with this premise the rate of flow through the siphon will be proportional to the product of the cross-section of this reservoir and the distance per minute that a point on the vessel 13 travels. The rate of flow is independent of friction losses in the bent tube or on the size of the tube, provided, of course, it is sufficiently large to take care of the quantity of liquid flowing.

The vessel 13 is provided with an overflow pipe 19 near its upper end which maintains a constant quantity of liquid therein and discharges through a vertical section 20 thereof into a stationary vessel 21. The liquid overflows from the moving vessel 13 through the pipe 19 into the stationary vessel 21 at the same rate that the liquid flows into the moving vessel. From the stationary vessel 21, the liquid overflows through the opening 22 and runs as a film down the surface of the wire 23 whose function it is to deliver the small amount of liquid constantly and thus avoid the drop effect which would result from surface tension and which is unavoidable when the path of the liquid is broken. This wire delivers the liquid into the fluid moving in the venturi 11 which takes it from the wire.

When the liquid level in the reservoir has fallen to within a short distance of the bottom, the descent of the vessel 13 is arrested. This may be effected automatically by having a stop 24 on the cable 16 engage the bottom abutment 25 on the support 26 for the drum 17 or by any well-known method. The operator must then wind up the drum which is equipped with a pawl 27 moving over the ratchet 28 on the shaft 18 so that free movement of the cable in the upper direction can be effected until the ascent is arrested by the upper limit stop 29. The reservoir 10 is now filled to the overflow pipe 12 to fix the liquid level to that coinciding with the upper position of the vessel 13, and operation may be resumed.

This device may be utilized to secure a constant flow of any liquid from storage to the point of utilization, and the flow is unchanged throughout the cycle by any conditions other than the cross-sectional area of the reservoir and the rate of lowering of the vessel 13. Since the reservoir is usually fixed, the rate of delivery of liquid can be entirely controlled by the speed of the clock which can be varied in any manner desired.

The invention is particularly adapted for automatic processes for by suitable electric interlock with the clock mechanism, the flow may be automatically suspended and renewed by the action of any other equipment.

The present apparatus differs from those devices which attempt to maintain a uniform flow by the use of a float for compensating for the fall of level, for in the present invention there is no compensating means but movement of the vessel 13 to actually produce the flow by continually maintaining a difference in level or head between the liquids in the vessels 10 and 13. By lowering the vessel 13, the level of the liquid in the vessel 10 is compelled to keep pace with it.

In the present invention there are no sliding parts and no parts in which friction can affect the rate of movement of the vessel 13 which is entirely dependent upon the movement of the shaft 18 controlled by a constant speed device. This is of particular importance where the device is to be used for very small flow rates. Where the rates of flow are extremely small, it follows that the existing head would be very small, and any variation due to friction would represent a large percentage of the existing head.

Having thus described the invention, what is claimed as new and desired to be secured by Letters Patent is:

1. In a device for delivering a constant uniform supply of liquid, in combination, a reservoir for said liquid, an open receiving vessel, a siphon having one end immersed in the liquid in each container, an overflow for said receiving vessel and automatic means to move one of said containers to maintan a constant difference in head between the liquid at the opposite ends of the siphon.

2. In a device for delivering a constant uniform supply of liquid, in combination, a stationary reservoir for said liquid, a receiving vessel having an overflow near its top, a siphon stationary in respect to said reservoir and having one end immersed in the liquid therein and the other end immersed in the liquid in said vessel, and automatic means to lower said vessel at a constant uniform rate to thus maintain a constant difference in head at opposite ends of said siphon.

3. In a device for delivering a constant uniform supply of liquid, in combination, a reservoir of uniform horizontal cross-section for said liquid, a receiving vessel having an overflow near its top, a siphon connecting said reservoir and vessel and having its ends immersed in the liquid therein and means to continuously move one of said liquid containers to maintain a difference in head between the liquid at the two ends of the siphon.

4. In a device for delivering a constant uniform supply of liquid, in combination, a stationary reservoir for said liquid, a receiving vessel having a delivery overflow near its top, a siphon tube having one end always immersed in the liquid in said reservoir and the other end always immersed in the liquid in said vessel and automatic means to lower said receiving vessel at such a rate as to maintain a constant head between the liquid in the reservoir and the liquid in the receiving vessel.

5. In a device for delivering a constant uniform supply of liquid, in combination, a reservoir for said liquid, a receiving vessel having an overflow delivery outlet near the top, a siphon having one end immersed in the liquid in each container, a cable suspending said receiving vessel and automatic means to lower said cable at a rate such as to keep a uniform head between the liquid levels at the two ends of the siphon.

6. In a device for delivering a constant uniform supply of liquid, in combination, a reservoir for said liquid, a receiving vessel having an overflow delivery outlet near the top, a siphon having one end immersed in the liquid in each container, a cable suspending said receiving vessel and means to lower said cable at a rate such as to keep a uniform head between the liquid levels at the two ends of the siphon, said means comprising a clockwork.

7. In a device for delivering a constant uniform supply of liquid, in combination, a reservoir for said liquid, a receiving vessel having an overflow delivery outlet near the top, a siphon having one end immersed in the liquid in each container, a cable suspending said receiving vessel and means to lower said cable at a rate such as to keep a uniform head between the liquid levels at the two ends of the siphon, said means comprising an electric clock.

8. In a device for delivering a constant uniform supply of liquid, in combination, a reservoir for said liquid, a receiving vessel having an overflow delivery outlet near the top, a siphon having one leg immersed in the liquid in each container, means to lower said receiving vessel at a rate to maintain a constant head between the two legs of the siphon, a stationary receptacle and means to deliver the liquid from said delivery outlet beneath the surface of the liquid in said receptacle.

9. In a device for delivering a constant uniform supply of liquid, in combination, a reservoir for said liquid, a receiving vessel having an overflow delivery outlet near the top, a siphon having one leg immersed in the liquid in each container, means to lower said receiving vessel at a rate to maintain a constant head between the two legs of the siphon, a stationary receptacle, means to deliver the liquid from said delivery outlet beneath the surface of the liquid in said receptacle, an overflow outlet from said receptacle and means combined with said last mentioned outlet to maintain the flow of liquid unbroken even where the quantity delivered is minute.

10. In a device for delivering a constant uniform supply of liquid, in combination, a reservoir for said liquid, a receiving vessel having an overflow delivery outlet near the top, a siphon having one leg immersed in the liquid in each container, means to lower said receiving vessel at a rate to maintain a constant head between the two legs of the siphon and means to limit the movement of said receiving vessel to less than the maximum immersion of the siphon leg in said reservoir.

11. The method of delivering a constant uniform supply of liquid comprising placing said liquid in two vessels, siphoning said liquid from one vessel to beneath the surface of the other, moving one of said vessels to maintain a constant head between the liquid in the two vessels and permitting liquid to overflow from the vessel at the lower level.

12. The method of delivering a constant uniform supply of liquid comprising placing said liquid in a reservoir, effecting a siphon flow of said liquid into a vessel, maintaining a substantially constant quantity of said liquid in said vessel, moving one of said containers in respect to the other to maintain a constant difference in head between the liquid levels at the two ends of the siphon and permitting said vessel to overflow the liquid delivered by said siphon.

13. In a device for delivering a constant uniform supply of liquid, in combination, a reservoir for said liquid, a receiving vessel, a conduit connecting said containers and having its ends below the level of the liquid in each, an overflow for said receiving vessel and controlled means to move one of said containers to maintain a constant difference in head between the liquid therein.

14. In a device for delivering a constant uniform supply of liquid, in combination, a reservoir for said liquid, a receiving vessel having an overflow near its top, a conduit connecting the containers below the liquid level therein, and automatic means to lower the vessel at such a rate as to maintain a constant difference in head between the liquid levels in said containers.

In testimony whereof I hereunto affix my signature.

ALVIN CHESLEY WILSON.